United States Patent [19]

Grütjen

[11] Patent Number: 5,723,157
[45] Date of Patent: Mar. 3, 1998

[54] EXTRUSION HEAD FOR PRODUCING HOSE- OR PIPE-SHAPED PREFORMS FROM EXTRUDABLE PLASTICS

[75] Inventor: Lothar Grütjen, Lohmar, Germany

[73] Assignee: W. Müller KG, Lohmar, Germany

[21] Appl. No.: 719,492

[22] Filed: Sep. 25, 1996

[30] Foreign Application Priority Data

Sep. 26, 1995 [DE] Germany ............... 195 35 749.3

[51] Int. Cl.[6] .................................................. B29C 47/26
[52] U.S. Cl. .......................... 425/133.1; 264/173.12; 264/173.16; 264/176.1; 425/380; 425/462; 425/467
[58] Field of Search ........................ 425/131.1, 133.1, 425/380, 461, 462, 467; 264/173.12, 173.16, 173.18, 176.1, 209.8

[56] References Cited

U.S. PATENT DOCUMENTS

| | | | |
|---|---|---|---|
| 3,308,508 | 3/1967 | Schrenk | 425/133.1 |
| 3,321,803 | 5/1967 | Corbett | 425/133.1 |
| 3,327,349 | 6/1967 | Lennox | 425/133.1 |
| 3,334,382 | 8/1967 | Lefevre | 425/133.1 |
| 3,365,750 | 1/1968 | Donald | 425/133.1 |
| 3,479,425 | 11/1969 | Lefevre et al. | 425/133.1 |

*Primary Examiner*—Jay H. Woo
*Assistant Examiner*—Joseph Leyson
*Attorney, Agent, or Firm*—Harness, Dickey & Pierce, P.L.C.

[57] ABSTRACT

The invention relates to an extrusion head for producing hose- or pipe-shaped preforms from extrudable plastics. The preforms are preferably composed of several layers. The extrusion head has a plurality of distributors which are combined to form units. Each unit includes four distributor discs (29 to 32) contacting one another via contact faces (33 to 38). The contact faces constitute planes perpendicular to the longitudinal axis (26). In the region of the contact faces of the distributor discs (29 to 32) a feeding channel is arranged with two passages which provide connections with two partial channels (43, 44). The partial channels are also arranged between the distributor discs (29 to 32) or the separating planes therebetween. Each end in one portion in the plane in which the central distributor discs (31, 32) contact one another form an annular exit gap (53). In this way it is possible to achieve a modular system and an assembly which is axially short. The assembly is also compact in the radial direction.

12 Claims, 5 Drawing Sheets

EXTRUSION HEAD FOR PRODUCING HOSE- OR PIPE-SHAPED PREFORMS FROM EXTRUDABLE PLASTICS

BACKGROUND OF THE INVENTION

The invention relates to an extrusion head which produces hose- or pipe-shaped preforms from extrudable plastics. The preforms are composed of at least one layer and are intended to form hollow members. Each layer has one distributor which includes a central bore and an annular exit gap. An annular gap is formed between the outer face of a mandrel and the bore of the distributor. The exit gap communicates with a flow channel fed by a feeding channel. The feeding channel connects with a channel which is connected to an extruder. The mandrel and the bore of the distributor have a joint longitudinal axis.

An extrusion head is described in WO 93/10956 wherein each distributor has two parts. Each part has a flange portion and a conical sleeve portion. The two parts are inserted into one another so that the two flange portions contact one another by contact faces which extend perpendicularly relative to the longitudinal axis. A connecting channel which ends in a feeding channel is divided into two arms and starts from the periphery of the two flange portions. The two arms of the feeding channel are provided in the flange portion faces contacting one another. The arms end in one flow channel each, which flow channels are worked helically into the outer face of the sleeve portion of the inner part of the two distributor parts and extend in a way which is similar to that of a double-threaded screw. The flow channels are open towards the wall of the bore of the sleeve portion of the outer part of the distributor. A plurality of distributors of the above-mentioned type follow one another in the direction of the longitudinal axis. The distributors are inserted into one another so that their upper portions extend as far as and into the bore of the flange portions of the adjacent distributor.

Also a prior art extrusion head exists where distributors are provided in the form of sleeves nesting inside one another. To produce preforms which include a plurality of layers, for example up to six layers, the extrusion head is complicated and furthermore, the radial space required is increased considerably. This limits utilization because, in any systems which include a plurality of such extrusion heads side by side, for example up to twelve in the case of multi-station systems, space restrictions exist. The diameter of the extrusion head influences the distance between stations considerably which, in turn, influences the number of products produced by the system. Furthermore, the extrusion head has to be newly designed for each application if, for example, preforms with a larger or smaller number of layers than that for which the extrusion head was designed are produced by the system.

Furthermore, inserting the distributors into one another affects the length of the flow paths. On the one hand, the objective is to ensure that the flow paths are as short as possible to prevent any adverse effects on the melt, however, on the other hand, the flow paths have to be such as to ensure a homogeneous structure.

Another disadvantage of the prior art embodiment is that the range of material output of such an extrusion head is limited regarding the performance in kg/hour. This means that, in respect of the achievable quality, optimum functioning is only ensured within narrow limits. This is due to the fact that the channels which guide the material in the form of heart curves ensure optimum functioning only within narrow limits. A further disadvantage is that the extrusion head is relatively long. Thus, the use of multiple extrusion heads on rotary machines to produce multi-layer hollow members is extremely limited or out of the question.

SUMMARY OF THE INVENTION

It is an object of the present invention to provide an extrusion head which offers a relatively large range of material output to be processed and at the same time permits production of preforms with a uniform quality across their circumference. Furthermore, the extrusion head should be of simple design and should be easily adaptable to different requirements regarding the number of layers to be produced.

In accordance with the invention, the distributor includes four distributor discs which contact one another via contact faces. The discs constitute planes which are positioned perpendicularly to the longitudinal axis. The feeding channel is arranged in at least one of the mutually touching contact faces of the two central distributor discs. The feeding channel is provided with passages. The flow channel is divided into two partial channels. One each is arranged in at least one of the mutually touching contact faces of a central distributor disc and that of an outer distributor disc. The two outer distributor discs include central projections which project into the central bores of the two central distributor discs. The projections are directed towards one another and between their ends facing one another, form an annular exit gap for the annular gap. The partial channels continue into the free space formed between the projections and the central bores of the central distributor discs as far as the exit gap.

An advantage of the above embodiment is for each layer a distributor unit is provided which constitutes a separate assembly. The components are not inserted into one another as regards the structure of the layers. The extrusion head can be adapted quickly to different tasks. The machine can be adapted to different tasks by adding or eliminating individual distributors in order to achieve the required number of layers. The distributors are arranged one beside the other along the longitudinal axis. Thus, it is possible to achieve a constant diameter independently of the number of layers produced. In consequence, in the case of a system with a plurality of extrusion heads, the distance between stations can be reduced considerably. Finally, the length of the assembly can be reduced to enable use of rotary machines. Furthermore, due to the way in which the channels are arranged and directed, especially due to the division, it is possible to achieve improved quality. This is achieved in the way material is guided in the channels to allow for variations in the structure and thickness of the wall which compensates for varied material flow rate.

Furthermore, by providing radial planes, the flow paths become relatively short. Nevertheless, it is possible to achieve a uniform melt. In particular, uniform melt is achieved by dividing the flows. Overall, a compact design is achieved. Since the flow paths are improved, the stresses in the preform are clearly reduced. Also, uniform stress distribution has a positive effect on the subsequent production stage of the hollow members, which is a blowing operation.

Finally, the weight of the extrusion head is reduced. The relatively small space required for the head means that retooling existing machines becomes simpler.

According to a further embodiment of the invention, the passages leading to the two partial channels are offset relative to one another. The offset achieves improved overlapping of the partial flows so that the stress distribution becomes even more uniform. The passages are preferably offset relative to one another around the longitudinal axis by 180°. The feeding channel, in a plan view of the contact face, has a semicircular annular groove shape. The connecting channel is arranged centrally between the ends of the feeding channel at which the passages are arranged.

The space available is advantageously utilized in that the feeding channel is worked into both mutually touching contact faces of the central distributor discs. One of the central distributor discs includes the passage to the first outer distributor disc. The further central distributor disc includes the passage to the second outer distributor disc.

This also applies to the partial channels. Furthermore, the flow behavior and distribution are advantageously influenced by the arrangement of the partial channel portion in the respective central distributor disc. The channel includes a tapered cross-section extending diametrically relative to the passage. The associated outer distributor disc, in its partial channel portion, is provided with a distributor web. The distributor web corresponds to the passage of the central distributor disc. Also, a taper is present which corresponds to the tapered cross-section of the central distributor disc.

To achieve necessary flow lengths which are as uniform as possible in respect of the two partial channels leading to the exit gap, the central distributor discs, across their contact faces intended for contacting the associated contact face of the outer distributor discs, include axially projecting annular projections. A central bore extends into the projections. In order to achieve accurate guidance towards the mandrel and the annular space formed between the projection bore and the bore of the distributor and to orientate the exit gap into the direction of extrusion, the central bore of each of the central distributor discs, towards its contact face which rests against the contact face of the other central distributor disc, include a tapered cross-section.

In a preferred embodiment, the distributor discs, by means of a connecting means, are removably connected to form one unit. This may be accomplished with bolts, for example.

Advantageously, the modular design may include plurality of distributors in a housing to form a basic unit. For example, it is possible to accommodate three distributors in one such housing and provide them with three extruders. If an extrusion head is to produce preforms with six layers, such an extrusion head may include two such basic units which are combined to form one assembly. Provision may be made for one of the assemblies such that one of the distributors of same is intended to be connected to the machine extruder whereas the other distributors are served by additional extruders.

BRIEF DESCRIPTION OF THE DRAWINGS

In FIG. 5, the illustration is such that the distributor plates are turned counter-clockwise by 90°. The sectional illustrations of FIGS. 6 to 8 correspond to the sectional plane according to FIG. 3.

DETAILED DESCRIPTION OF THE DRAWINGS

Figure 1:
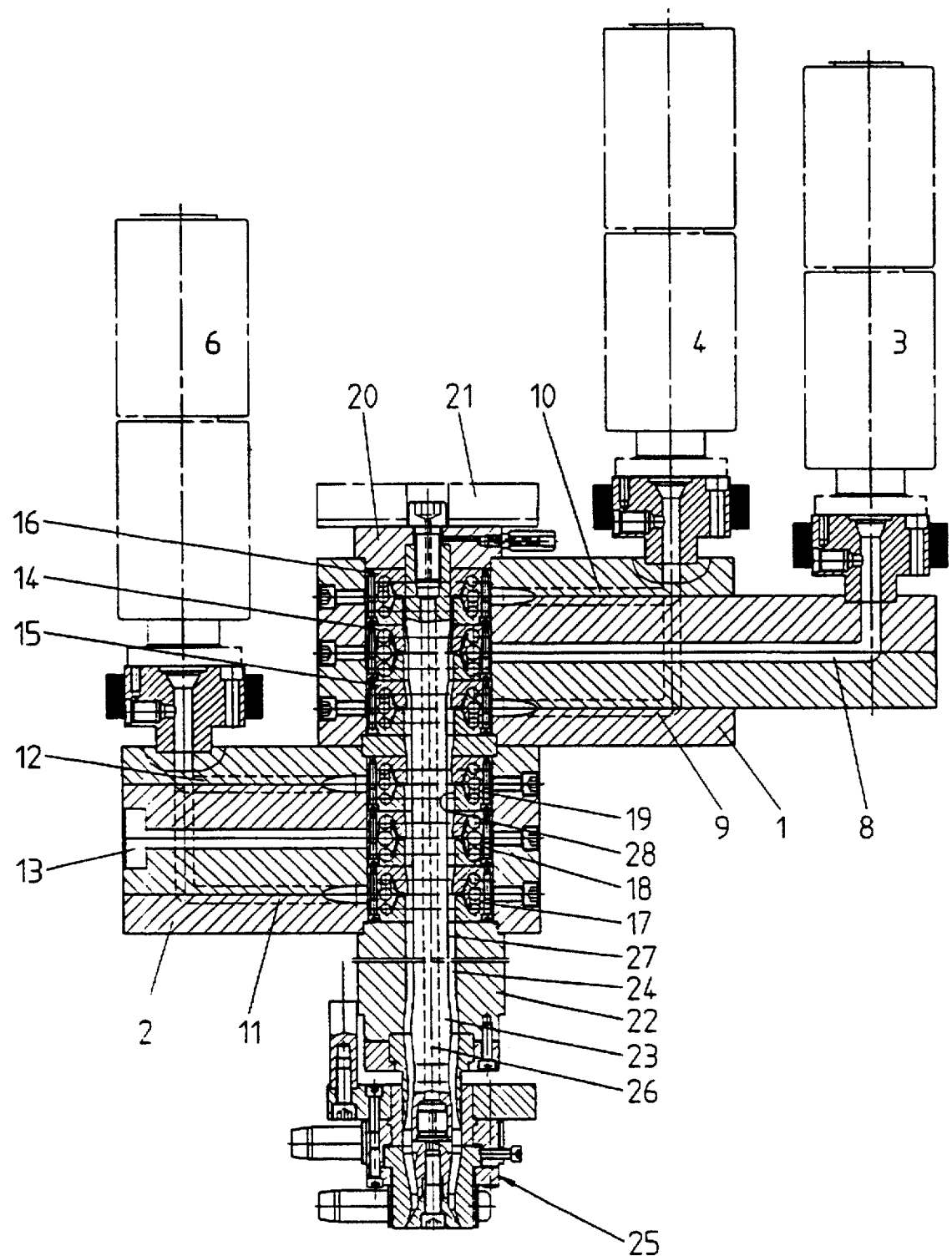
FIG. 1 is a cross-section view through an extrusion head and an associated additional extruder.
Figure 2:
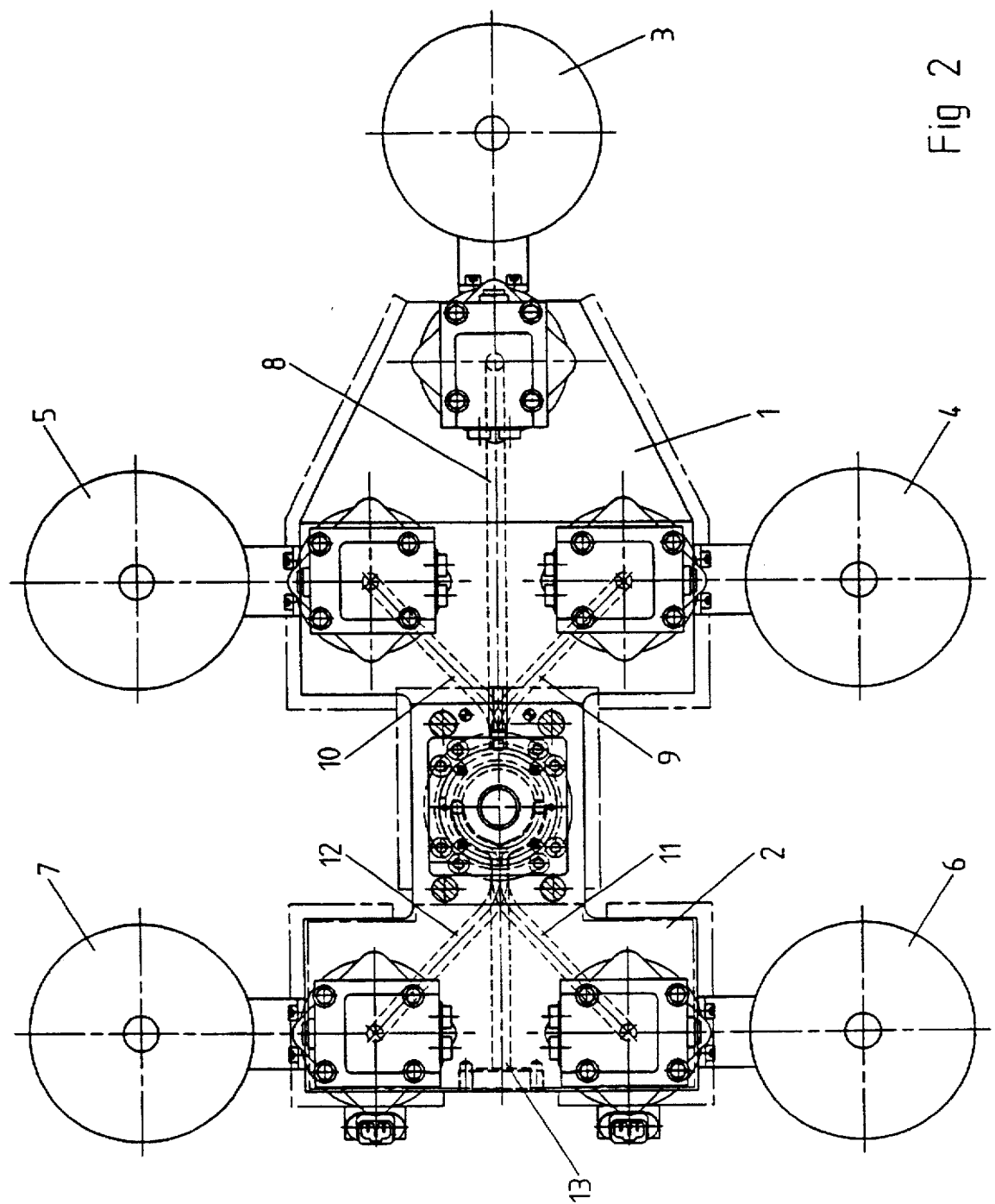
FIG. 2 is a plan view according to FIG. 1.
Figure 3:
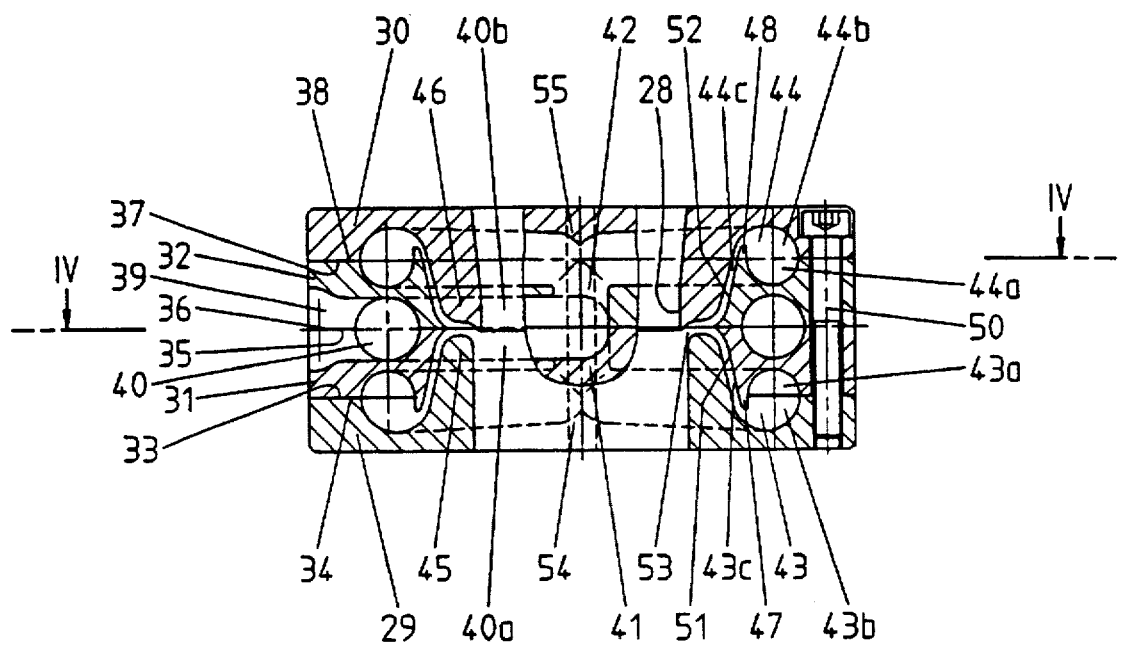
FIG. 3 is a cross-section view through a distributor unit according to FIG. 1, referring to the distributor unit served by a machine extruder, along the sectional line III—III of FIG. 4.

The extrusion head according to FIGS. 1 and 2 includes two housings 1, 2, with additional extruders 3, 4, 5 associated with the housing 1 and with additional extruders 6, 7 and a machine extruder (not illustrated) associated with the housing 2. The machine extruder and the additional extruders are provided to supply one or a plurality of extrusion heads arranged one beside the other.

The housing 1, built up in a plate-shaped way, receives distributors 14, 15, 16 which, via connecting channel 8, 9, 10, are connected to the associated extruder. The additional extruders 6, 7 associated with the housing 2 are connected to the connecting channels 11, 12, with the machine extruder being connected to the connecting channel 13. The distributors 17, 18, 19 are arranged in the housing 2. Towards the upper end, the housings 1, 2 are covered by a cover 20 and a carrying plate 21. The carrying plate 21 fixes an adjusting device to control the wall thickness. The adjusting device is connected to the forming unit 25 to form the final dimensions of the preform.

The two housings 1, 2 are connected to one another by a centering plate. Towards the lower end of the forming unit 25, the housing 2 is followed by a spacing sleeve 22. The distributors 14 to 19 define a bore 28 which is profiled and through which there extends a mandrel 23. The mandrel 23 also includes a profiled outer face 27. Between the outer face 27 and the bore 28, an annular gap 24 is formed with a cross-section which increases towards the forming unit 25 in accordance with the layer build-up. The mandrel 23 and the distributors 14 to 19 are centered on a joint longitudinal axis 26.

Below there will follow a description of the composition and the individual parts of a distributor with reference to distributor 18. From the point of view of the functioning of the major parts, the individual distributors are substantially composed in the same way, with the exception of the bore 28 which differs in respect of the thickness of the layers to be produced.

The distributor 18 includes four distributor discs, a lower outer distributor disc 29, an outer upper distributor disc 30 and two central distributor discs 31, 32. The distributor discs 29 to 32 contact one another by means of contact faces. They are firmly connected to one another by bolts 50 and form a unit. The lower outer distributor disc 29, via contact face 33, rests against the contact face 34 of the lower central distributor disc 31. The lower central distributor disc 31 includes a contact face 36 which is contacted by the upper central distributor disc 32 via contact face 35. The contact face 38 of the upper central distributor disc 32 facing away therefrom is contacted by the contact face 37 of the upper outer distributor disc 30. All contact faces 33 to 38 are arranged in planes perpendicular to the longitudinal axis 26.

The two central distributor discs 31, 32 each include a connecting channel 39. The connecting channels 39 are worked into both contact faces 35, 36. The connecting channels complement one another and are connected to the connecting channel 13 according to FIG. 1 for the machine extruder. The plastic material ejected by the machine extruder passes through the connecting channel 39 and reaches a feeding channel 40. The feeding channel 40 includes two semi-circular grooves. Feeding channel portion 40a is arranged in the contact face 36 of the distributor disc 31. Channel 40b is in the contact face 35 of the distributor disc 32. At its end, the feeding channel portion 40a includes a passage 41 leading to a partial channel 43. A partial channel portion 43a is arranged in the contact face 34 of the central distributor disc 31. Partial channel portion 43b is in the contact face 33 of the outer lower distributor disc 29. The partial channel portions 43a and 43b are provided in the form of annular grooves in the respective contact faces 33, 34. The outer, lower distributor disc 29 includes a projection 45 which projects towards the plane in which the two contact faces 35, 36 of the two central distributor discs 31, 32 contact one another. The projection 45 outer face is cone-shaped and forms a partial channel 43c leading to the bore 51 in the lower central distributor disc 31. An annular projection 47 projects downwardly therefrom.

A passage 42 is arranged in the upper central distributor disc 32 and is offset by 180° relative to the passage 41. The passage 42 connects the feeding channel 40 to the upper central distributor disc 32 and the partial channel 44 associated with the upper outer distributor disc 30 to the feeding channel 40. The partial channel 44 also includes partial channel portions 44a, 44b and 44c. The partial channel portion 44a is an annular channel worked into the contact face 38 of the upper central distributor disc 32. The partial channel portion 44b is arranged in the opposed contact face 37 of the upper outer distributor disc 30. The partial channel portion 44c is provided between the bore 52, in the upper central distributor disc 32, as well as an annular projection 48, projecting upwardly from the contact face 38 of same and the outer face of the projection 46 of the upper outer distributor disc 30. The partial channel portion 44c ends approximately at the level of the two mutually touching contact faces 35, 36 of the two central distributor discs 31, 32 to form an annular exit gap 53.

Figure 4:
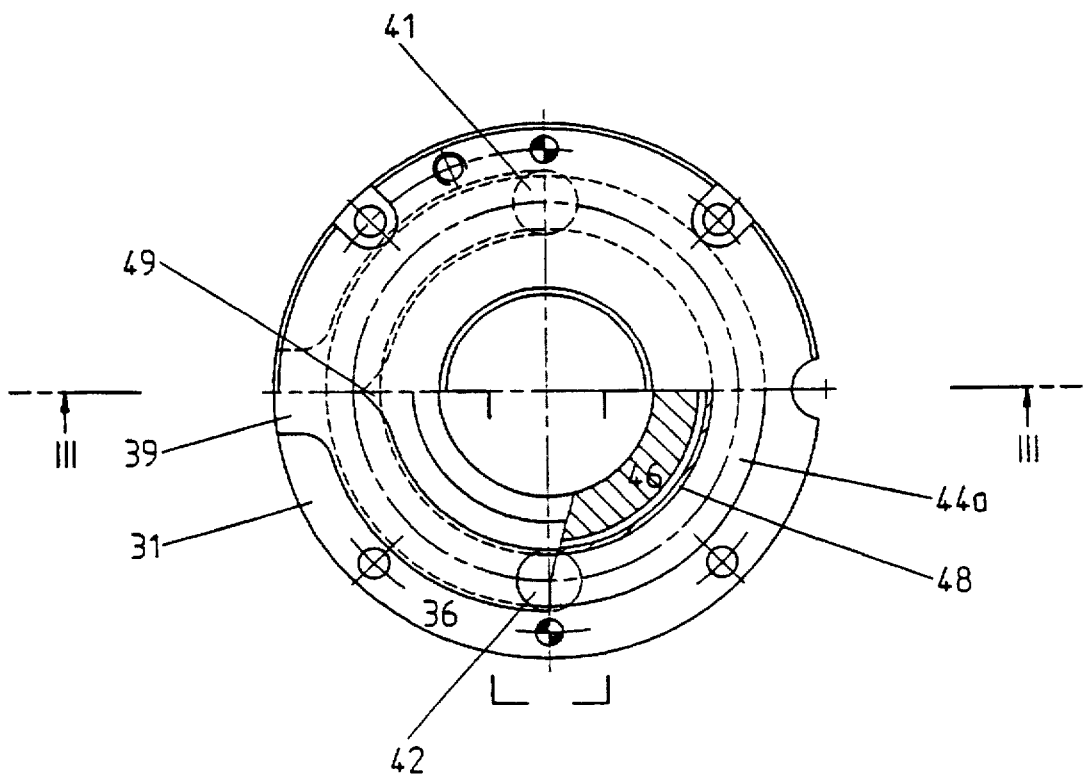
FIG. 4 is a plan view, partially in section, according to the sectional line IV—IV of FIG. 3.
Figure 5:
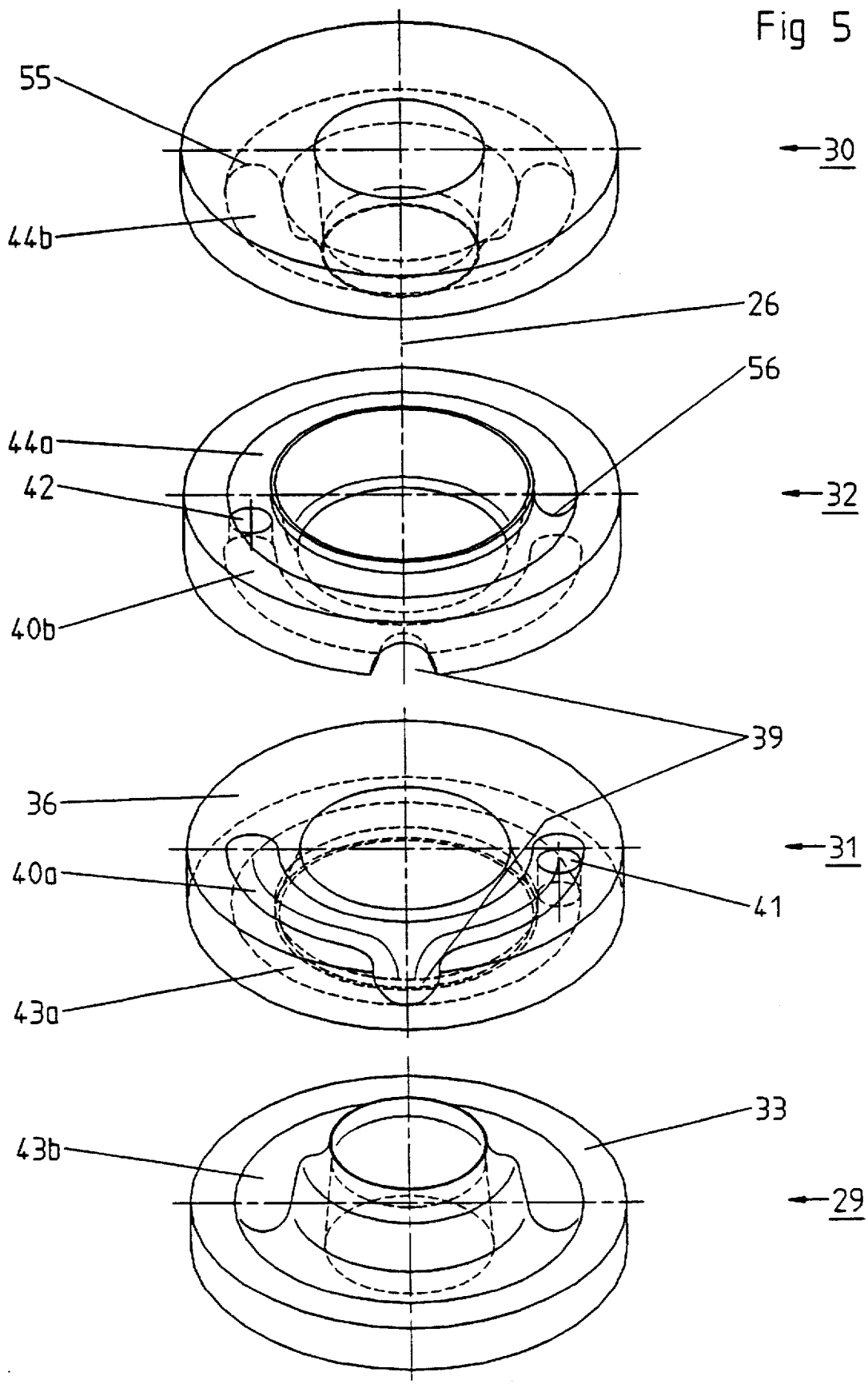
FIG. 5 is an exploded view of the distributor according to FIG. 3.
Figure 6:
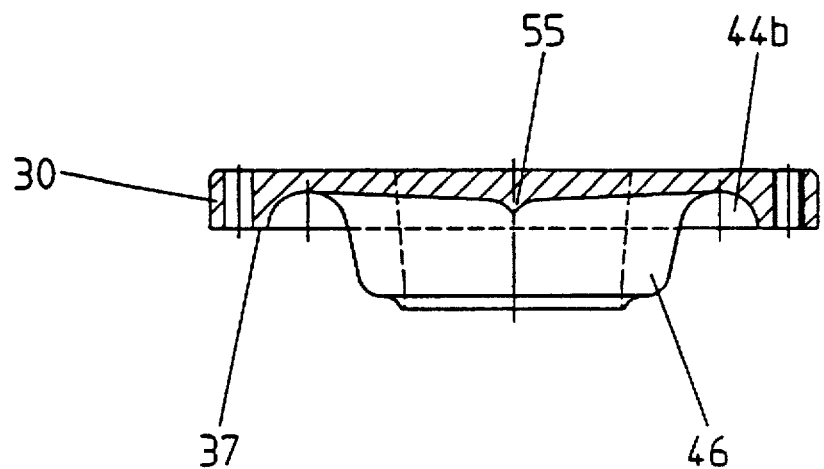
FIG. 6 is a cross-section view of one of the two outer distributor plates, the upper distributor plate, of the distributor according to FIG. 3.
Figure 7:
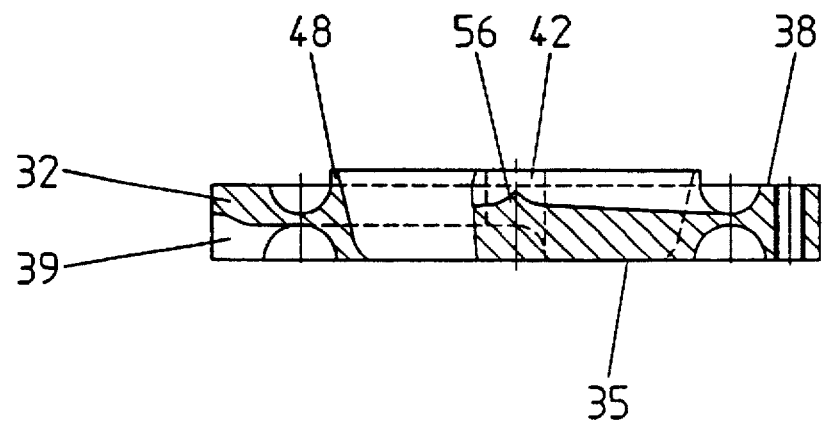
FIG. 7 is a cross-section view of the central distributor plate associated with the upper distributor plate of FIG. 3.
Figure 8:
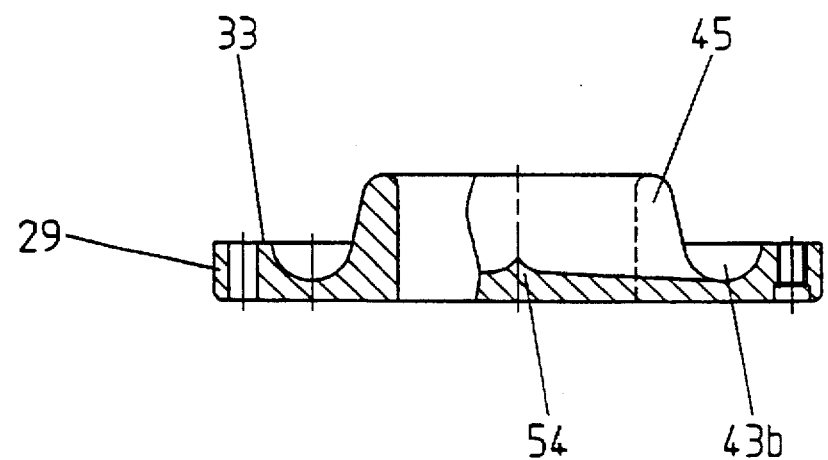
FIG. 8 is a cross-section view of the further outer distributor plate, the lower distributor plate, of FIG. 3.

FIG. 4, in particular, makes it clear that the connecting channel 39 is provided with a flow divider 49. The flow divider 49 ensures that the material conveyed by the extruder is divided and flows into the two arms of the feeding channel 40. The material flows through the passages 41, 42 and reaches the partial channels 43, 44. Due to the way in which the partial channels 43, 44 are guided and due to their connections with the feeding channel 40, the material becomes more uniform. Thus, material deviations are compensated for due to the overlapping of the partial flows. Furthermore, to achieve more advantageous flow conditions, distributor webs 54, 55, 56 are provided to avoid dead spaces. Of these, the distributor web 54 is positioned opposite the passage 41 and serves to divide the flow and cause the material to flow in both directions of the partial channel 43. Diametrically thereto, two distributor webs 55, 56 are arranged which cause the material to be deflected in the direction of flow towards the exit gap 53. Thus, any visible seams or irregularities do not occur. Due to the flow channels being arranged radially in planes perpendicular to the longitudinal axis distributors are obtained which include a relatively short axial length relative to the longitudinal axis 26. Furthermore, due to the material flow and flow channels being divided, it is possible to achieve a good material flow, which enables the layers to uniformly build up.

Finally, these measures enable a modular design and a relatively short axial length of the extrusion head to produce preforms in a multi-layer design. In particular, the short axial length permits application in rotary machines or retooling of existing machines without adversely affecting the distance between two extrusion heads. The radial dimensions are very small compared to distributors inserted into one another. These distributors are conventionally provided in the form of sleeves.

While the above detailed description describes the preferred embodiment of the present invention, the invention is susceptible to modification, variation and alteration without deviating from the scope and fair meaning of the subjoined claims.

I claim:

1. An extrusion head for producing hose- or pipe-shaped preforms from extrudable plastics, the preforms composed of at least one layer and intended for forming hollow members, said extrusion head comprising:

at least one distributor per layer of the preform;

each distributor having a central bore and an annular exit gap for an annular gap formed between each distributor and an outer face of a mandrel, the exit gap communicating with a flow channel fed by a feeding channel;

the feeding channel including a connecting channel for connecting to an extruder and the central bore of each distributor defining a longitudinal axis, said distributor including two outer and two central distributor discs which contact one another via contact faces, said contact faces being on planes perpendicular to the longitudinal axis, said feeding channel arranged in at least one contact face of the two central distributor discs, said feeding channel provided with passages, said flow channel being divided into two partial channels of which one each is arranged in at least one of the contact faces of a central distributor disc and an outer distributor disc, said passages leading to the two partial channels said two outer distributor discs include central projections directed towards one another and projecting into central bores of the two central distributor discs and said projections, between their ends, facing one another, forming the annular exit gap for the annular gap and said partial channels continuing into the free space formed between the projections and the central bores of the central distributor discs as far as the exit gap.

2. An extrusion head according to claim 1, wherein said passages leading to the two partial channels are offset relative to one another.

3. An extrusion head according to claim 2, wherein the passages are offset relative to one another around the longitudinal axis by 180° and that said feeding channel in a plan view of the respective contact face, has a semi-circular annular groove shape, said connecting channel arranged centrally between the ends of said semi-circular annular groove at which the passages are arranged.

4. An extrusion head according to claim 1, wherein said feeding channel is worked into both mutually touching contact faces of the central distributor discs of said central distributor discs, a first one of said passages extending to a first one of said outer distributor discs, and a second one of said passages extending to a second one of said outer distributor discs.

5. An extrusion head according to claim 1, wherein said partial channels are each worked into both mutually touching contact faces of said central distributor discs and said outer distributor discs, each forming a closed ring.

6. An extrusion head according to claim 5, wherein partial channel portions arranged in the respective central distributor disc include a tapered cross-section extending diametrically relative to the respective passage and said associated outer distributor disc in its partial channel portion is provided with a distributor web corresponding to the respective passage of the central distributor disc, said partial channel including a taper corresponding to the tapered cross-section of the central distributor disc.

7. An extrusion head according to claim 1, wherein said central distributor discs across their contact faces intended for contacting the associated contact face of the outer distributor discs include axially projecting annular projections into which a central bore extends.

8. An extrusion head according to claim 7, wherein the central bore of each of the central distributor discs includes a tapered cross-section towards its contact face resting against the contact face of the other central distributor disc.

9. An extrusion head according to claim 1, wherein said distributor discs are connected removably by connecting means to form one unit.

10. An extrusion head according to claim 9, wherein the connecting means are provided in the form of bolts.

11. An extrusion head according to claim 1, further including at least one housing, wherein a plurality of said distributors are combined in said housing.

12. An extrusion head according to claim 11, further including a plurality of said housings which are combined to form an assembly.

* * * * *